(12) United States Patent
Wernet et al.

(10) Patent No.: US 8,096,178 B2
(45) Date of Patent: Jan. 17, 2012

(54) APPARATUS FOR CAPACITIVE ASCERTAINING AND/OR MONITORING OF FILL LEVEL

(75) Inventors: Armin Wernet, Rheinfelden (DE); Roland Dieterle, Lörrach (DE); Kaj Uppenkamp, Wehr (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 572 days.

(21) Appl. No.: 11/988,278

(22) PCT Filed: May 16, 2006

(86) PCT No.: PCT/EP2006/062339
§ 371 (c)(1), (2), (4) Date: Apr. 24, 2009

(87) PCT Pub. No.: WO2007/006599
PCT Pub. Date: Jan. 18, 2007

(65) Prior Publication Data
US 2009/0211356 A1    Aug. 27, 2009

(30) Foreign Application Priority Data
Jul. 7, 2005   (DE) .......................... 10 2005 032 131

(51) Int. Cl.
*G01F 23/26* (2006.01)
(52) U.S. Cl. ...................................................... 73/304 C
(58) Field of Classification Search ................. 73/304 C
See application file for complete search history.

(56) References Cited

U.S. PATENT DOCUMENTS

| 3,956,760 | A |   | 5/1976  | Edwards |         |
|-----------|---|---|---------|---------|---------|
| 4,412,450 | A |   | 11/1983 | Franz   |         |
| 4,676,101 | A |   | 6/1987  | Baughman|         |
| 4,679,433 | A |   | 7/1987  | Clinton |         |
| 5,485,401 | A | * | 1/1996  | Cadman  | 702/116 |
| 2005/0172712 | A1 | * | 8/2005 | Nyce | 73/304 C |

FOREIGN PATENT DOCUMENTS

| DE | 43 12 813 A1   | 10/1994 |
| DE | 102 31 946 A1  | 1/2004  |
| JP | 5-273324       | 10/1993 |
| RU | 2 029 345      | 2/1995  |

* cited by examiner

*Primary Examiner* — Hezron E Williams
*Assistant Examiner* — Paul West
(74) *Attorney, Agent, or Firm* — Bacon & Thomas, PLLC

(57) ABSTRACT

An apparatus for capacitive ascertaining and/or monitoring of the fill level of a medium in a container. The apparatus includes at least one probe unit, which is electrically insulated relative to the medium, and at least one electronics unit, which supplies the probe unit with at least one electrical, actuating signal, receives an electrical measurement signal from the probe unit, and evaluates the measurement signal as regards the fill level The actuating signal is an electrical alternating voltage signal. The electronics unit is embodied in such a manner that it supplies the probe unit with the actuating signal in a measuring phase, and supplies the probe unit with a test signal in a test phase, and that it receives a test measurement signal in the test phase from the probe unit, wherein the test signal is selected in such a manner that it has at least one section with an essentially constant voltage value.

6 Claims, 3 Drawing Sheets

APPARATUS FOR CAPACITIVE ASCERTAINING AND/OR MONITORING OF FILL LEVEL

TECHNICAL FIELD

The invention relates to an apparatus for capacitive ascertaining and/or monitoring of fill level of a medium in a container.

BACKGROUND DISCUSSION

In the case of capacitive fill level measurement or monitoring, a probe unit (for example, a probe rod or a probe cable) and the wall of the container, in which the medium is located, or a second probe unit, form the two electrodes of a capacitor. The medium serves, in such case, as the dielectric. Since the capacitance of the capacitor changes as a function of fill level height, fill level can be deduced from the capacitance. For measuring capacitance, in such case, an actuating signal is fed to the probe unit. This is most often an electrical, alternating voltage of predetermined frequency. Tapped from the "measuring capacitor" is a measurement signal. This is usually an electrical current signal, which is, most often, converted, for example by a resistance element, into a voltage signal for further processing. From this, then the capacitance, and, therewith, the fill level, is ascertained or monitored.

Since a conductive medium can lead to a short circuit or, at least, to a corruption of the measured values, in practice, completely insulated probes are used. In such case, for example, a plastic insulation (PP, PTFE, PFA) is used. In the case of conductive media, in this way, a measurement independent of the dielectric constant is achieved, in which only the insulation capacitance covered by the medium is still relevant.

In practice, for example, in the case of measuring heated water, it can happen that diffusion of the medium through the probe insulation will occur and that, in this way, ohmically conducting, transition, or interface, resistances form in the process connection. In the case of diffusion, an electrical connection can occur with the container wall or with ground, for example through the medium, especially in the region of the—most often grounded—housing. A further possibility is that, through damage to the insulation, the medium can penetrate to the probe unit and form, in this way, likewise, an ohmically conductive resistor parallel to the measuring capacitance. This effect of additional resistance leads to a corruption of the measured value and even to total failure of the measuring device.

SUMMARY OF THE INVENTION

An object of the invention is thus to provide a capacitive measuring device having an insulated probe unit, in the case of which penetration of the medium through the insulation can be reliably recognized.

The invention achieves the object by the features that the electronics unit is embodied in such a manner that it applies the actuating signal to the probe unit in a measuring phase, that it supplies the probe unit with a test signal in a test phase, and that it receives a test measurement signal from the probe unit in the test phase The test signal is embodied in such a manner that it has at least one section with an essentially constant voltage value. The invention thus resides in the feature that the probe unit is operated with two different signals. In a first instance, the operating signal is that for the measuring phase. The signal is an electrical alternating voltage, such as is used in the state of the art for measuring fill level. The second signal, the test signal, is fed to the probe unit during the test phase. This signal is a direct voltage signal. From the test measurement signal resulting therefrom, it can then be concluded whether the insulation is still complete or whether the medium has entered therethrough. For the successful test—i.e. for recognizing that the insulation has been compromised—the probe unit should be contacted by a medium, i.e. the condition should be present, in which the damaged insulation layer or the insulation layer compromised by diffusion degrades the measured value. Thus, the invention permits reliable recognition of damage to the insulation, or diffusion through the insulation, such as can lead to measured value corruption. In this way, also an early recognition (predictive maintenance) of an only slightly damaged probe is possible. This increases the functional safety of the measuring device considerably.

Ascertaining capacitance in the case of a capacitive measuring device is done, in general, using a continuously applied, alternating voltage, and by measuring the alternating current flowing through the measuring capacitor, as formed by the probe unit, the wall of the container and the medium. In the invention, the continuous alternating current measurement is preferably regularly interrupted by test phases. During the time of the pause occurring in such case, a direct voltage level is applied to the probe. The direct voltage signal is applied to the measuring probe e.g. by an output port of a processor or other electronic switch through a resistor—preferably high ohms, e.g. 200 kOhm—or, for example, by a voltage divider referenced to ground. Preferably—in the case where the electronic unit uses a microprocessor—the test measurement signal resulting at the probe unit in direct voltage form from the test signal is read back into the electronics unit via an analog/digital converter, in order there to be evaluated. If the probe unit is not damaged, then a known direct voltage value results, which is dependent on the character of the test signal. If the probe or the insulation surrounding the probe unit is damaged, then the direct voltage value which can be read back sinks, depending on the type of damage and conductivity of the medium, in the direction of 0 V. By the "back and forth" switching between alternating current (i.e. the actuating signal) and the direct current signal (i.e. test signal), accuracy of the capacitance measurement is not lessened, while insulation defects, which lie in a range up to 100 K ohm, are detected with certainty.

An embodiment provides that the test signal is essentially an electrical direct voltage signal. The test phase should be as short as possible, in order not to disturb the measurements and in order also not to require too much energy. Since it is necessary that the test signal has, at least over a period of time, an essentially constant voltage level, this directs that the test signal be completely a direct voltage signal.

An embodiment of the invention provides that the electronics unit compares a voltage value resulting from the test measurement signal with a desired voltage value dependent on the test signal. If no electrical connection has arisen through the medium, then the test signal is being applied essentially only to the capacitance of the probe unit (i.e. inner conductor plus insulation layer). Consequently, a certain voltage value can be tapped. This value is, however, dependent on the test signal and the other components which are present. If this value results, then the insulation is in order, or at least no medium has diffused in, at least not enough to produce a negative effect. If, because of medium in the probe unit, or in the housing, in which the electronics unit is located, an electrical connection has been produced, then the voltage of the test signal falls across this connection. Associated with this, the voltage value which can be read out lies below the value to be expected. Various tolerance ranges can be specified for corresponding issuance of alarms or signals. If the voltage value falls within a first tolerance range, i.e. the resistance resulting from the penetrated medium is within a perhaps still tolerable range, then a warning can be produced, which can be interpreted, for example, to the effect that hair cracks are present. If the voltage value sinks still further, then a distinct alarm is issued, because too much medium has penetrated in. These limits can be adjusted as appropriate for the specific measurement situation.

An embodiment of the invention provides that the electronics unit produces an error report in the case in which the voltage value resulting from the test measurement signal differs from the desired voltage value dependent on the test signal by more than a predeterminable tolerance range. The voltage value determinable from the test measurement signal changes when the insulation is no longer complete or when, by diffusion, medium has penetrated through the insulation. If the voltage value corresponds to the desired value, then there is no additional electrical connection through the medium. If however the voltage value differs from the desired value, then medium has penetrated and there is either need for immediate intervention or, at least, appropriate measures should be planned for the not too distant future.

An embodiment of the invention provides that the test signal is embodied in such a way that, at least for a predeterminable period of test time, an essentially constant voltage value is applied to the probe unit. Depending on the components used, it is possible that a constant voltage does not result immediately at the probe unit. Consequently, it is required to apply a constant voltage, at least for the time which the components or combination of components require. This length of time can be ascertained, for example, from test measurements on the measuring device.

An embodiment of the invention provides that at least one microprocessor is provided in the electronics unit. A microprocessor simplifies operating the measuring device and offers also the opportunity for directly digitizing the measured signal. Moreover, different measurement or also test procedures can be implemented more easily.

BRIEF DESCRIPTION OF THE DRAWINGS

The invention will now be explained in greater detail on the basis of the appended drawings, the figures of which show as follows.

DETAILED DISCUSSION

Figure 1:
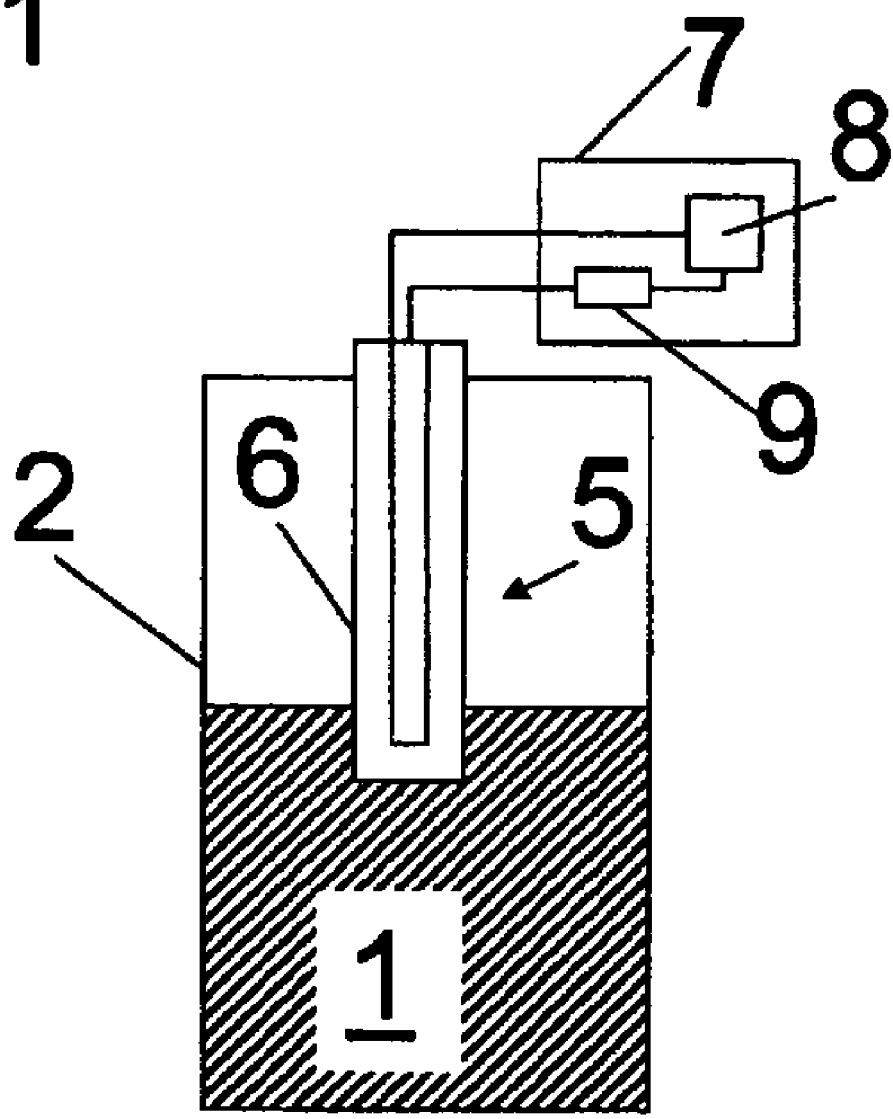
FIG. 1 a schematic representation of the measuring apparatus of the invention.

FIG. 1 shows, schematically, an application of a measuring device of the invention for ascertaining and/or monitoring fill level of a medium 1 in a container 2. Medium 1 is a liquid; it can, however, also be a bulk good. The probe unit 5 (in this instance, a so-called probe rod or probe cable) and the wall of the container 2 form, with the medium 1, a measuring capacitor. Its capacitance depends on the fill level of the medium 1, so that, from the measured capacitance value, fill level can be ascertained. For measuring the capacitance, the probe unit 5 is supplied by the electronics unit 7 with an actuating signal AS. This is usually an electrical, alternating voltage signal of predeterminable frequency. The alternating current signal measured at the probe unit 5 as measurement signal is then usually converted via a resistor (not shown) into a voltage signal and then appropriately evaluated. The electronics unit 7 thus feeds the probe unit 5 with an actuating signal AS, receives the measurement signal, and ascertains therefrom the fill level, or monitors such therewith. If medium 1 is electrically conductive, then the actual probe unit is surrounded with an insulating layer 6. If, due to aging or strong loading, the insulating layer 6 becomes unsealed or if the medium 1 diffuses through the insulating layer 6, then electrical connections form in the measuring device and these degrade the measurement signal or can even lead to failure of the measuring device. In order to monitor this, the measuring device is equipped according to the invention.

In the electronics unit 7 there is a microprocessor 8 for control and measuring. Microprocessor 8 supplies the probe unit 5 in the measuring phase with the actuating signal AS and receives the measurement signal. In a test phase, the probe unit 5 is supplied with the test signal TS, and the test measurement signal is received. Preferably, the test phase occurs when the medium 1 is covering the probe unit 5, because, in this way, in the case of damage to the insulation 6, the largest measurement effects are obtained. If the actuating signal AS is an electrical alternating voltage, then the test signal TS is, according to the invention, an electrical direct voltage. The test signal TS must in such case be so selected, that it remains at a constant voltage value, at least over a period of time, which can be set. If, in the case of the actuating signal AS, the applied voltage varies, then, in the case of the test signal TS, the voltage must remain constant, at least during a predeterminable length of time. The length of time depends especially on the character of the participating components. The test signal TS allows read-out of the test measurement signal. In the illustrated case, the test measurement signal is digitized via an analog/digital converter 9, in order then to be evaluatable by the microprocessor 8. From this digitized test measurement signal, a voltage value is ascertained, which is compared with the desired voltage value dependent on the test signal TS. If the insulation 6 is no longer complete or if, for other reasons, medium 1 has penetrated, then the voltage value of the test measurement signal moves toward a zero or, in any event, differs from the desired voltage value. Consequently, an alarm signal can then be issued by the electronics unit 7. Microprocessor 8 is not essential for performing the invention; it enables, however, a simpler and, above all, more easily modifiable implementation of the measuring device. A switch for switching between actuating signal and test signal is advantageous. Additionally, the analog/digital converter 9 is only one possible embodiment for comparing, with the desired voltage value, the voltage resulting from the test measurement signal. Alternatively, this can be accomplished by using an operational amplifier as the comparator.

Figure 2:
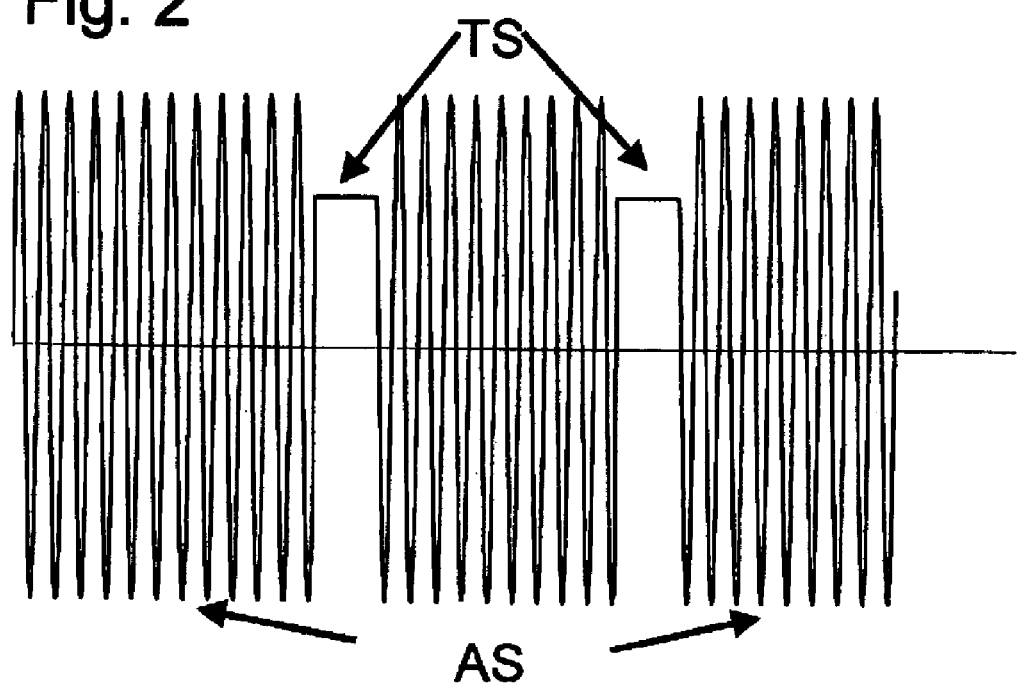
FIG. 2 a schematic drawing of the signals applied to the probe unit in the invention.

FIG. 2 shows, schematically, signal amplitude as a function of time, as supplied according to the invention to the probe unit 5 of the measuring apparatus of the invention. The voltage signal switches between the alternating voltage of the actuating signal AS and the direct voltage of the test signal TS. The test phase can be regularly inserted with any predetermined time of repetition. If the probability of a compromising of the insulation layer 6 or of diffusion of medium 1 through such is smaller, than the test can be, correspondingly, performed less frequently. It is, however, possible to keep the test phase very short, since the read-out of the voltage value can already be sufficient. Consequently, the general measurement is not affected. Advantageous, thus, is an embodiment wherein, after every measuring phase, there is a test phase.

Figure 3:
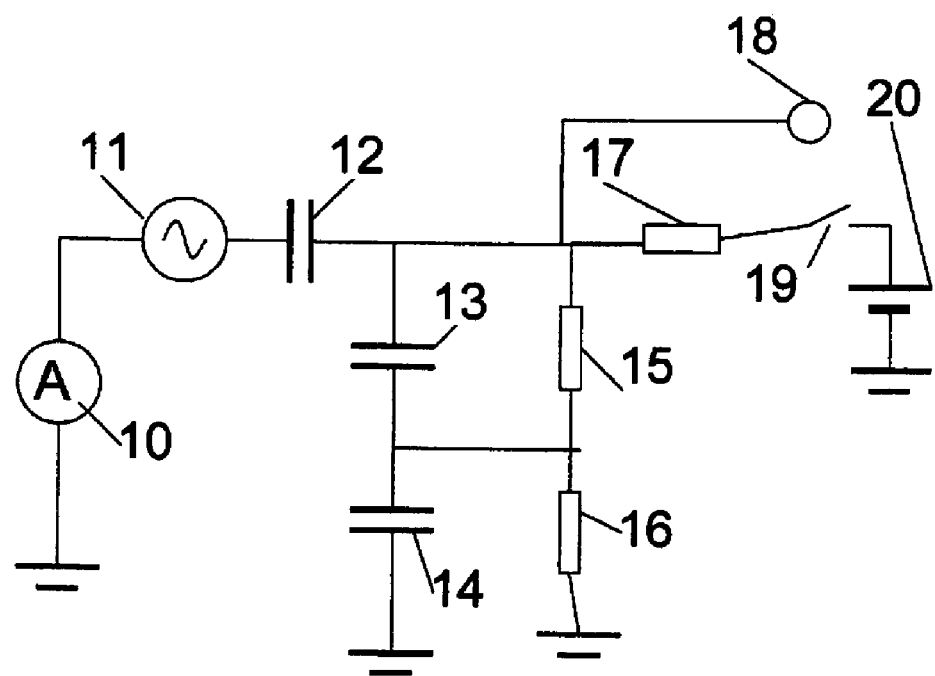
FIG. 3 a schematic equivalent-circuit of the measuring device of the invention.

FIG. 3 shows an equivalent circuit for the measuring apparatus. The left section relates to the measuring phase and the right section the test phase. The alternating voltage source 11 is connected with the probe unit via a coupling capacitor 12, which filters the direct current portion out of the actuating signal. The probe unit is represented here by two capacitors. In such case, involved are the capacitance which results in connection with the medium, capacitor 14, and the capacitance which results from the insulation layer, capacitor 13. From the current measurement via the corresponding measuring device 10, the total capacitance of the probe unit is ascertained and therefrom the fill level. The right side represents the case in which, because of damage to the insulation, conductive material has penetrated into the measuring device. This leads to a conductive connection, and, inversely, an electric resistor 15. This produces with the medium a conductive connection and connects the measuring device thus also with the medium resistance 16. In the test phase, via a switch 19, a direct voltage signal is provided by the corresponding direct voltage source 20, via a resistor 17, to the probe unit. Switch 19 can be implemented, for example, by appropriately switching an output/port of a microprocessor. If, now, the case presents itself in which the insulation is completely closed, then the direct voltage signal would be applied only to the capacitances 13, 14. Therefore, a voltage value dependent on the character of the test signal would result at the analog/digital converter 18. In the illustrated case, however, the voltage is applied to the two resistances 15, 16, i.e. the voltage value, which results, is smaller than the value to be expected. In this way, it is possible to deduce the condition of the insulating layer from the monitoring of the voltage value.

The invention claimed is:

1. An apparatus for capacitive ascertaining and/or monitoring of fill level of a medium in a container, comprising:
    at least one probe unit, which is electrically insulated relative to the medium by an insulating layer surrounding said at least one probe unit; and
    at least one electronics unit, which supplies said at least one probe unit with at least one electrical, actuating signal, receives an electrical measurement signal from said probe unit, and evaluates the measurement signal with respect to the fill level, wherein:
    the actuating signal is an electrical, alternating voltage signal; and
    said electronics unit is embodied in such a manner that it supplies said at least one probe unit, in a measuring phase, with the actuating signal, that it supplies said at least one probe unit, in a test phase, with a test signal; wherein the test signal is embodied in such a manner that it has at least one section with an essentially constant voltage value, that it receives a test measurement signal from said at least one probe unit in the test phase and that it infers from the test measurement signal whether the insulating layer has been compromised.

2. The apparatus as claimed in claim 1, wherein:
    the test signal is essentially an electrical, direct voltage signal.

3. The apparatus as claimed in claim 1, wherein:
    said electronics unit compares a voltage value resulting from the test measurement signal with a desired voltage value dependent on the test signal.

4. The apparatus as claimed in claim 3, wherein:
    said electronics unit produces an error report in the case wherein the voltage value resulting from the test measurement signal differs from the desired voltage value dependent on the test signal by more than a predeterminable tolerance range.

5. The apparatus as claimed in claim 1, wherein:
    the test signal is selected in such a manner that, at least for a predeterminable test time period, an essentially constant voltage value is applied to said at least one probe unit.

6. The apparatus as claimed in claim 1, wherein:
    at least one microprocessor is provided in said electronics unit.

* * * * *